INVENTOR
Arnold M. Walkow

United States Patent Office 3,435,181
Patented Mar. 25, 1969

3,435,181
METHOD OF WELDING USING CONCENTRIC ELECTRODES
Arnold M. Walkow, Dallas, Tex., assignor to Texas Instruments Incorporated, Dallas, Tex., a corporation of Delaware
Filed June 30, 1965, Ser. No. 468,224
Int. Cl. B23k 9/28
U.S. Cl. 219—91                              3 Claims

ABSTRACT OF THE DISCLOSURE

A method of welding wherein an electrode fixture containing a cylindrical outer electrode and conical center electrode is used to weld microminiature electronic components. The electrode is placed so that a portion of the outer electrode is in contact with the surface of one of two objects to be welded and a portion of the conical inner electrode is in contact with the edge of that surface.

---

This invention relates to an electrode fixture for use in a welding apparatus. More particularly it relates to a single side welding electrode fixture having concentric electrodes adapted, among other uses, to weld the caps of microminiature electronic components such as semiconductor networks and the like to the body of the components.

Conventional methods of welding have included the utilization of two electrodes whereby the two metallic objects to be joined are placed in series between the electrodes and the current passes from one electrode to the other through both of the objects. This is particularly disadvantageous since access must be had to the two outside surfaces, i.e., the bottom and top surfaces, and also each of such outside surfaces must be electrically conductive. This requirement prevents the use of such a conventional welding method in welding the cap of an integrated circuit to the body of the circuit, if the circuit has a nonconductive bottom plate, for example, a ceramic plate.

Still another conventional welding method includes the use of the so-called "parallel gap" welding electrodes, wherein two electrodes are so spaced on a single surface as to weld two metal objects together, one of which is in contact with neither electrode. However, this method has the inherent disadvantage of requiring that the welding apparatus be rotationally positioned for many welding applications.

Another disadvantage of the prior art welding systems, especially in securing the cap onto an integrated circuit package, is the problem of erratic welding along the edge of the top surface of the cap due to a nonuniform positioning of one or the other of the electrodes in respect to the edge. This effect becomes apparent upon placing one of the electrodes slightly away from tthe edge of the top surface, since the positioning above described prevents the welded connection from extending to the edge. Still another disadvantage is concerned with the problem of ensuring contact of both of the electrodes to the surface.

It is therefore an object of the present invention to provide a welding electrode fixture which can be used on a single surface.

Another object of the invention is to provide a welding electrode fixture which eliminates the necessity of rotating the welding apparatus.

A further object of the invention is to provide a welding electrode fixture which facilitates the positioning of one of the electrodes with the edge of at least one of the surfaces to be welded.

Figure 1:
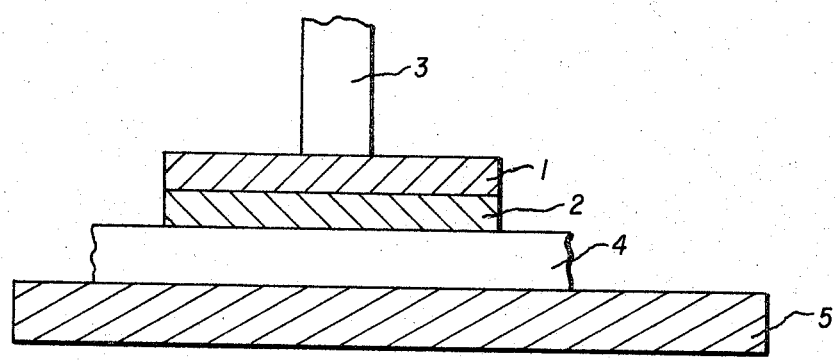
Figure 2:
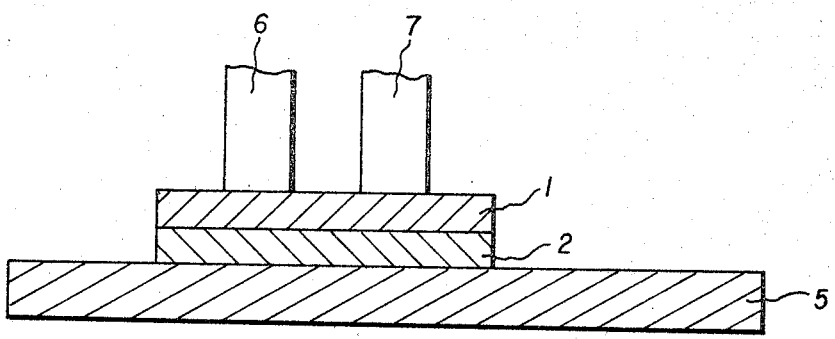
Figure 3:
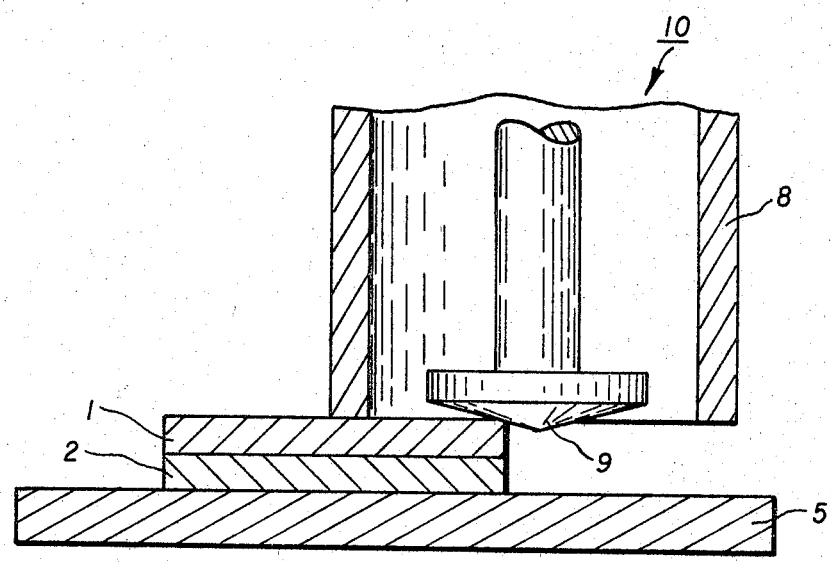
Figure 4:
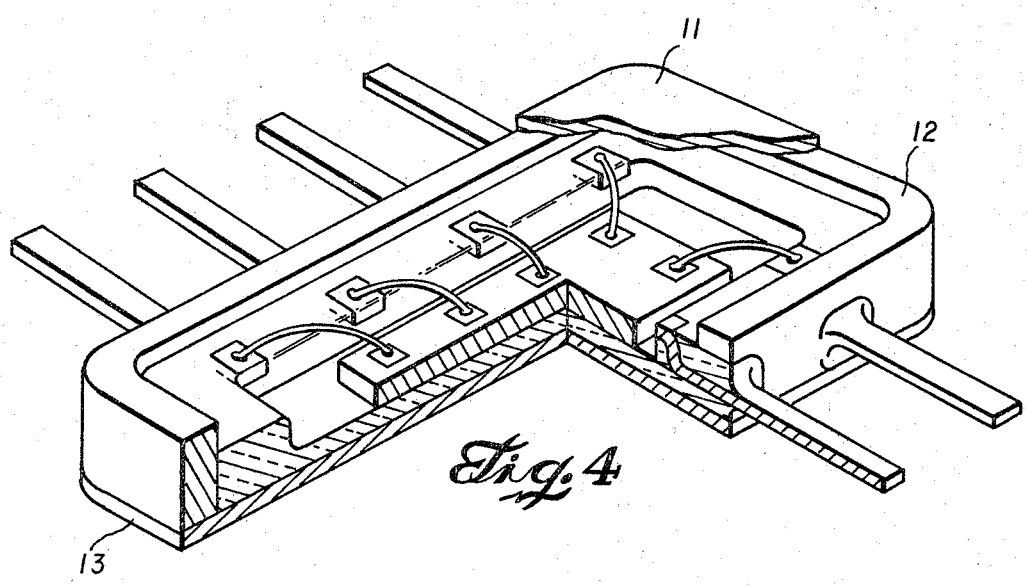

Additional objects and advantages of this invention will be evident to those skilled in the art from the following detailed description, appended claims and attached drawings, wherein:

FIGURE 1 illustrates a conventional welding fixture;
FIGURE 2 illustrates a second conventional welding fixture;
FIGURE 3 illustrates a sectional view of a single side welding anode fixture according to the invention; and
FIGURE 4 illustrates a pictorial view of an integrated circuit package particularly adaptable to a welding operation using the welding electrode fixture of FIGURE 3.

The invention, in brief, comprises a concentric pair of electrodes for utilization in a single side or surface welding operation, wherein the center electrode has a bevel-shaped or a conical-shaped welding surface to facilitate welding at the edge of a surface. The beveled edge eliminates the problem of positioning one of the electrodes exactly at the edge of the surface and thus ensures a uniform weld, especially in welding the cap on to integrated circuit packages or the like. Since the electrodes are concentric, the entire perimeter of the cap may be welded without rotating any part of the welding apparatus. Such a beveled-edge center electrode also eliminates the possibility of one of the electrodes not making contact to the surface, it being relatively easy for even an inexperienced technician to "feel" when both electrodes are in contact.

With reference to the drawings and especially to FIGURE 1, there is illustrated one of the conventional welding fixtures wherein the two objects 1 and 2 to be welded together are respectively in contact with electrodes 3 and 4, all of which are supported by the member 5. Obviously, this system will not function properly unless the objects 1 and 2 are both metallic to provide a series path for current to flow between the two electrodes. For example, if object 2 were to have a ceramic substrate (not illustrated), the system would not function.

FIGURE 2 illustrates one representative conventional variety of a "parallel cap" welding electrode fixture, wherein objects 1 and 2 are to be welded together while supported by the member 5. Electrodes 6 and 7 both make contact with the surface 1 and, as is well known in the welding art, proper spacing of the electrodes and a proper current (not shown) applied to the same, depending upon the thickness and material of objects 1 and 2, will create a welded seam between the two objects. Obviously, this requires a delicate maneuvering by the welder to place one of the electrodes at the edge of the surface, and is furthermore undesirable in that it would be necessary to rotate either the whole welding apparatus, or at least the anode fixture, for many welding operations such as welding around a closed loop, for example the top edge or perimeter of an integrated circuit package.

FIGURE 3 illustrates a welding electrode fixture 10 according to the invention, wherein the fixture 10 is comprised of a pair of concentric electrodes 8 and 9. The inner electrode 9 has a beveled edge welding surface to facilitate positioning of said electrode welding surface upon the edge of object 1 while welding object 1 to object 2. The welding takes place by applying a current source (not illustrated) between electrodes 8 and 9, a welding surface of the cylindrically shaped electrode 8 also contacting the surface of object 1 adjacent the edge of object 1 which is being contacted by the beveled edge welding surface of electrode 9.

FIGURE 4 illustrates an integrated circuit package having a metal body 12, a metal cap 11 and a ceramic substrate 13, the package being an example of where the welding electrode fixture according to the invention has particular appropriate utility. However, the fixture of FIGURE 3 according to the invention is not limited to any such utilization, but will function in an almost unlimited number of applications wherein single surface welding is desired.

It is to be understood that the above-described welding fixture is merely illustrative of the application of the principles of the invention. Numerous other arrangements may be devised by those skilled in the art without departing from the spirit and scope of the invention as defined by the appended claims.

What is claimed is:

1. A method of welding together two metallic objects being in contact with each other near their edges by the use of a welding electrode fixture having a center welding electrode with a conical welding surface located within an outer electrode, comprising the steps of:
    (a) placing a portion of the surface of said outer electrode in contact with one surface of one of said two metallic objects,
    (b) placing a portion of said conical welding surface of said center electrode in contact with the edge of said one surface of said one of said two metallic objects, and
    (c) applying electrical current between said center and said outer electrodes, whereby said two metallic objects are welded together.

2. A method of welding together two metallic objects being in contact with each other near their edges by the use of a welding electrode fixture having a center welding electrode with a beveled edge welding surface located within an outer electrode, comprising the steps of:
    (a) placing a portion of the surface of said outer electrode in contact with one surface of one of said two metallic objects,
    (b) placing a portion of said beveled edge welding surface of said center electrode in contact with the edge of said one surface of said one of said two metallic objects, and
    (c) applying electrical current between said center and said outer electrodes, whereby said two metallic objects are welded together.

3. A method of welding together two metallic objects being in contact with each other near their edges by the use of a welding electrode fixture having a center welding electrode with a conical welding surface located within an outer cylindrically-shaped electrode, comprising the steps of:
    (a) placing a portion of the surface of said outer electrode in contact with one surface of one of said two metallic objects,
    (b) placing a portion of said conical welding surface of said center electrode in contact with the edge of said one surface of said one of said two metallic objects, and
    (c) applying electrical current between said center and said outer electrodes, whereby said two metallic objects are welded together.

References Cited

UNITED STATES PATENTS

| | | | |
|---|---|---|---|
| 2,272,968 | 2/1942 | Dyer | 219—86 |
| 2,068,043 | 1/1937 | Warnke | 219—119 |
| 3,036,198 | 5/1962 | Grimland et al. | 219—78 |
| 3,235,704 | 2/1966 | Rockwell | 219—119 |

RICHARD M. WOOD, *Primary Examiner.*

C. CHADD, *Assistant Examiner.*

U.S. Cl. X.R.

219—86, 119